A. J. THOMPSON.
STALK CHOPPER.
APPLICATION FILED FEB. 3, 1910.
964,337.
Patented July 12, 1910.
2 SHEETS—SHEET 1.
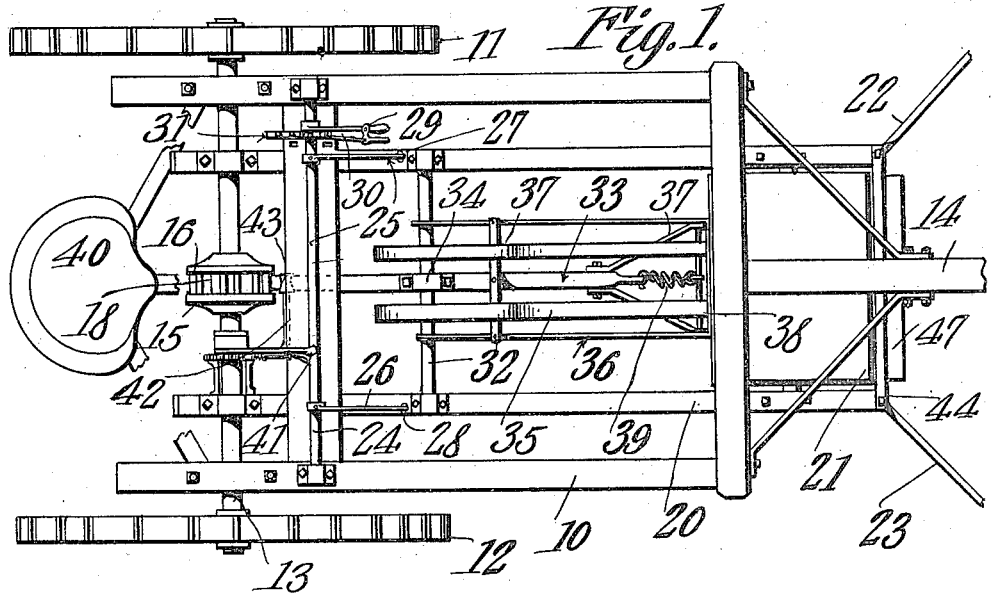
Fig. 1.
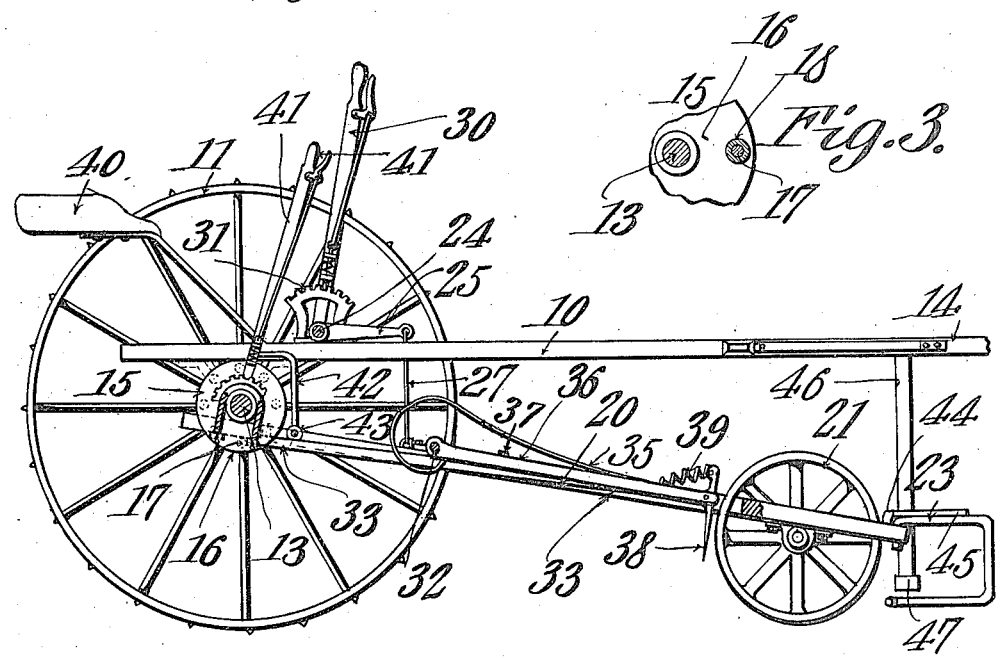
Fig. 2.  Fig. 3.
Inventor
Andrew J. Thompson A. J. THOMPSON.
STALK CHOPPER.
APPLICATION FILED FEB. 3, 1910.
964,337.
Patented July 12, 1910.
2 SHEETS—SHEET 2.
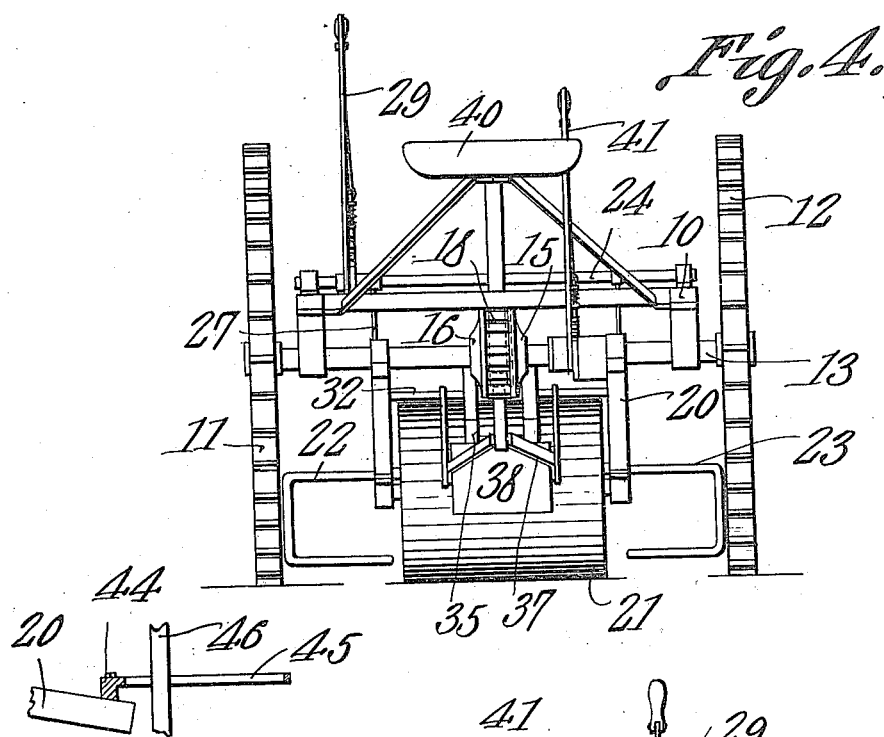
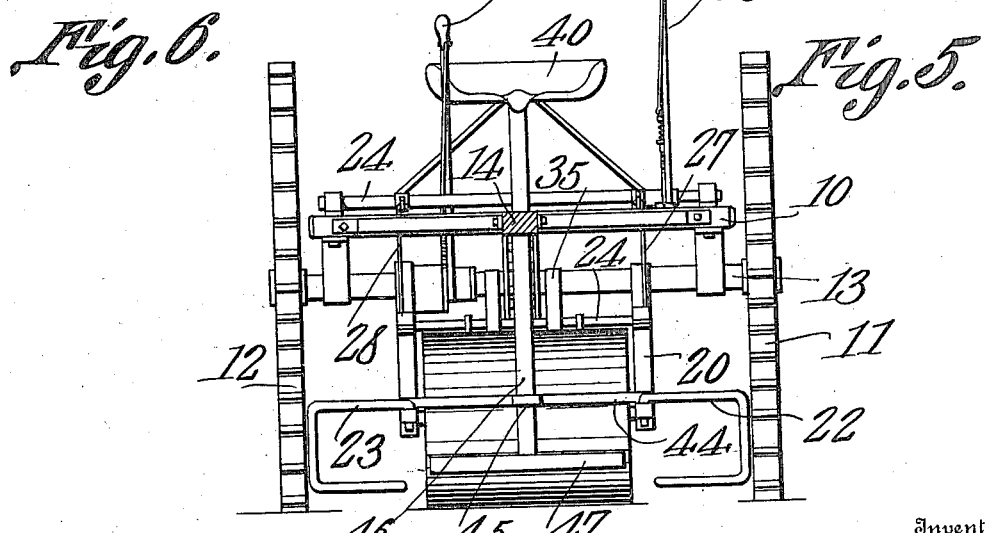
Inventor
Andrew J. Thompson

UNITED STATES PATENT OFFICE.

ANDREW J. THOMPSON, OF SPRINGDALE, ARKANSAS, ASSIGNOR OF ONE-FOURTH TO W. L. NORWOOD, ONE-FOURTH TO C. A. PEARSON, AND ONE-FOURTH TO M. F. THOMPSON, OF SPRINGDALE, ARKANSAS.

STALK-CHOPPER.

964,337.  Specification of Letters Patent.  Patented July 12, 1910.

Application filed February 3, 1910. Serial No. 541,704.

*To all whom it may concern:*

Be it known that I, ANDREW J. THOMPSON, a citizen of the United States, residing at Springdale, in the county of Washington and State of Arkansas, have invented a new and useful Stalk-Chopper, of which the following is a specification.

This invention relates to devices employed for breaking down and severing cotton stalks, corn stalks, and the like preparatory to clearing the field for plowing, and has for its object to simplify and improve devices of this character and produce an apparatus whereby the stalk may be more thoroughly operated upon, and the invention consists in the novel construction and arrangement of its parts as hereinafter shown and described.

In the accompanying drawings,—Figure 1 is a plan view of the stalk chopper. Fig. 2 is a side elevation of the same with one of the supporting wheels removed and parts broken away. Fig. 3 is a detail view of a disk used in the chopper. Fig. 4 is a rear end elevation of the chopper. Fig. 5 is a front end elevation of the chopper. Fig. 6 is a detail sectional view of a cross bar used upon the chopper.

The device comprises a supporting frame 10, of any suitable size and material and mounted upon wheels 11 and 12 which in turn support an axle 13. A tongue or other draft means as 14 is connected to the said frame.

A tappet 15 is fixed to the axle 13 and consists of side disks 16 joined together at regular intervals in the vicinity of their peripheries by cross bolts 17 upon which sleeves 18 are loosely journaled.

Mounted to swing upon the axle 13 is a frame 20 formed of spaced side members extending forwardly and carrying a roller 21 for rotation therein and likewise provided with spaced gathering hooks 22 and 23 operating to gather the stalks which may extend too far to be reached by the roller and draw them inwardly in front of the roller.

Rotatively mounted on the frame 10 is a rock shaft 24 carrying arms 25 and 26 connected by links 27 and 28 to the side members of the frame 20, this shaft having a lever arm 29 provided with a pawl 30 engaging a notched segment 31, as shown. By this means the frame 20 with its attached roller and gathering hook may be elevated when desired.

Mounted upon the frame member 20 is a shaft 32 upon which is pivotally supported an arm 33 by means of a bearing box 34 attached to the said arm and receiving the said shaft.

Springs 35 are attached at their rear ends to the shaft 32 and bear at their forward ends upon the upper edge of a blade 38 to be described presently and located at the forward ends of the bars 36. The springs 35 are under tension with a tendency to hold the forward ends of the bars 36 down. The rear end of the arm 33 extends into the path of movement of the sleeves 18 forming parts of the tappet structure 15. Bars 36 are pivoted at their rear ends to the shaft 32 and are connected with the arm 33 by means of braces 37. By this arrangement it will be seen that as the tappet structure 15 rotates the sleeves 18 will successively engage the rear portion of the arm 33 and elevate the forward portion thereof. A blade 38 is pivotally mounted between the forward ends of the bars 36 and is located in advance of the forward end of the arm 33. One end of a spring 39 is attached to the back portion of the blade 38 and the other end of the said spring is connected with the forward end portion of the arm 33 and the said spring is under tension with a tendency to hold the blade yieldably in a position substantially at right angles to the said arm 33. As the rear end of the arm 33 escapes the sleeves 18 carried by the bolts 17 forming portions of the tappet structure 15, the forward end of the said arm 33 descends and the blade 38 comes in contact with the surface of the ground behind the roller 21.

It will be noted that the pivotal point 32 is at a relatively high point above the ground so that the cutting edge of the blade 38 enters the ground in a rearwardly inclined position or extending rearwardly at an angle to the plane of the horizontal, the object of which will be hereinafter explained. An operator's seat 40 is mounted upon the frame 10. A lever 41 is fulcrumed upon the axle 13 and at its lower end is provided with a laterally disposed arm 42 carrying a roller 43. The said roller 43 is located over the rear portion of the arm 33 and consequently as the said lever 41 is swung in a forward direction the roller bears down upon the rear portion of the arm 33 and carries the same below the path of movement of the sleeve 18 forming portions of the tappet mechanism 15. Thus said tappet mechanism is free to rotate without swinging the arm 33 as above described.

As the machine is moved over plants to be severed, the roller 21 crushes the stalks in a forward direction and the hooks 22 and 23 operating in advance of the roller gather any stalks which may extend beyond the roller and draw them into the path of the same. As the cutting blade 38 descends immediately behind the roller it strikes the prostrate stalks and severs them and then continues onward into the ground at a rearward inclination and severs the stalks or roots just below the surface of the ground. By this means the stalks are not only severed as they lie in depressed position upon the ground but the stumps are partially uprooted thus materially aiding the after work of plowing them up. As the machine is constantly moving forward during the action of the cutting blades, when the latter enters the ground a relatively severe leverage strain is exerted between the blades and the arm 33 which might break one or the other if a rigid joint were formed between them, but by pivotally mounting the blades and providing a yielding flexible connection between the blade and the arm, the point of the blade yields to the strain and breakage is thus prevented. If desired the machine may be made wide enough to operate on two or more rows of plants at the same time.

A cross bar 44 connects the forward ends of the side members of the frame 20 together and is provided with an elongated guide 45. A standard 46 extends down from the tongue 14 and is rigid with the same. The lower portion of the standard 46 passes through the guide 45 and a cross arm 47 is fixed to the lower end of the standard 46 and is located in advance of the roller 21. As the machine passes over the ground the arm 47 comes in contact with standing stalks and bends or breaks them down so that they may be rolled flat by the roller 21. The frame 20 may swing vertically with relation to the frame 10, but the standard 46 and guide 45 will swing the forward portion of the frame 20 in a lateral direction in unison with similar movement on the part of the frame 10 and hence will relieve the connection between the frame 20 and axle 13 of strain.

Having described the invention what I claim as new and desire to secure by Letters Patent is:—

1. A chopper comprising a wheel mounted axle, a frame mounted upon said axle, a tappet device carried by the axle, arms pivotally connected at their rear ends with the axle, a stalk roller journaled between the forward portions of said arms, a hoe frame pivotally mounted upon said arms, a spring engaging the hoe frame and tending to hold the same in depressed position, an arm pivotally connected with the hoe frame and projecting into the path of movement of the tappet device, a hoe pivotally mounted upon the hoe frame and resiliently held in its normal position and located behind said roller and a stalk depresser rigidly mounted upon the first said frame and located in advance of the roller.

2. A chopper comprising a wheel mounted axle, a frame mounted upon said axle, a tappet device carried by the axle, arms pivotally connected at their rear ends with the axle, a roller journaled between the forward portions of said arms, a guide mounted on the forward ends of said arms, a stalk depresser attached to said frame and passing through said guide and located in advance of the roller, a hoe frame pivotally mounted upon said arms, resilient means engaging the hoe frame and adapted to hold the same in depressed position, a bar pivotally connected with the hoe frame and having its rear portion projecting into the path of movement of the tappet device, and a hoe pivotally mounted upon the hoe frame and held under spring tension in a normal position.

In testimony that I claim the foregoing as my own, I have hereto affixed my signature in the presence of two witnesses.

ANDREW J. THOMPSON.

Witnesses:
S. W. CLARK,
S. E. WILLIAMSON.